(12) United States Patent
Yang et al.

(10) Patent No.: US 11,272,458 B2
(45) Date of Patent: Mar. 8, 2022

(54) DATA TRANSMISSION METHOD, TERMINAL DEVICE, AND NETWORK DEVICE

(71) Applicant: GUANGDONG OPPO MOBILE TELECOMMUNICATIONS CORP., LTD., Guangdong (CN)

(72) Inventors: Ning Yang, Guangdong (CN); Zhi Zhang, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 19 days.

(21) Appl. No.: 16/754,079

(22) PCT Filed: Oct. 13, 2017

(86) PCT No.: PCT/CN2017/106076
§ 371 (c)(1),
(2) Date: Apr. 6, 2020

(87) PCT Pub. No.: WO2019/071576
PCT Pub. Date: Apr. 18, 2019

(65) Prior Publication Data
US 2020/0336988 A1  Oct. 22, 2020

(51) Int. Cl.
*H04W 52/34* (2009.01)
*H04W 52/14* (2009.01)
*H04J 3/16* (2006.01)
*H04W 52/24* (2009.01)
*H04W 52/42* (2009.01)
*H04W 72/04* (2009.01)

(52) U.S. Cl.
CPC ......... *H04W 52/146* (2013.01); *H04J 3/1694* (2013.01); *H04W 52/243* (2013.01); *H04W 52/42* (2013.01); *H04W 72/042* (2013.01)

(58) Field of Classification Search
CPC ........... H04W 72/0446; H04W 52/146; H04W 48/12; H04W 52/0235; H04W 52/04;
(Continued)

(56) References Cited

U.S. PATENT DOCUMENTS

2012/0208583 A1  8/2012  Chung
2013/0083730 A1  4/2013  Gaal et al.
(Continued)

FOREIGN PATENT DOCUMENTS

CN  102209374 A  10/2011
CN  103002450 A  3/2013
(Continued)

OTHER PUBLICATIONS

English translation of the Written Opinion of the International Search Authority in the international application No. PCT/CN2017/106076, dated Jun. 27, 2018.
(Continued)

*Primary Examiner* — Tu X Nguyen

(57) ABSTRACT

Provided are a data transmission method, a terminal device and a network device. The method comprises: a terminal device receiving indicator information, said indicator information being used for the terminal device to determine a first transmission power for uplink data in a target time unit; the terminal device determining the first transmission power according to the indicator information; the terminal device sending uplink data to a first network device in accordance with the first transmission power in the target time unit. A data transmission method embodied in the present invention can effectively increase a data transmission success rate.

14 Claims, 2 Drawing Sheets

(58) Field of Classification Search
CPC ............. H04W 52/143; H04W 52/228; H04W 52/242; H04W 52/325; H04W 52/34; H04L 1/1614
See application file for complete search history.

(56) References Cited

U.S. PATENT DOCUMENTS

| | | | |
|---|---|---|---|
| 2013/0083731 A1 | 4/2013 | Gaal et al. | |
| 2013/0084913 A1 | 4/2013 | Gaal et al. | |
| 2014/0022961 A1* | 1/2014 | Park | H04W 52/146 370/280 |
| 2015/0289211 A1 | 10/2015 | Lee et al. | |
| 2016/0066288 A1 | 3/2016 | Feng | |
| 2017/0078971 A1 | 3/2017 | Noh et al. | |

FOREIGN PATENT DOCUMENTS

| | | |
|---|---|---|
| CN | 104601253 A | 5/2015 |
| CN | 106487472 A | 3/2017 |
| CN | 104601253 B | 4/2017 |
| CN | 111034312 A | 4/2020 |
| EP | 3047588 A1 | 7/2016 |
| RU | 2627306 C1 | 8/2017 |
| WO | 2014067131 A1 | 5/2014 |
| WO | 2014179979 A1 | 11/2014 |
| WO | 2017143536 A1 | 8/2017 |

OTHER PUBLICATIONS

Supplementary European Search Report in the European application No. 17928417.9, dated May 28, 2020.
"3rd Generation Partnership Project; Technical Specification Group Radio Access Network; Evolved Universal Terrestrial Radio Access (E-UTRA) and NR; Multi-connectivity; Stage 2 (Release 15)"; 3GPP TS 37.340 V0.4.0 Aug. 25, 2017, Section 4.1.2.
Nokia et al: "On power sharing between LTE and NR in DC", 3GPP Draft; R1-1714097 Dual Connectivity Power Sharing.3rd Generation Partnership Project (3GPP), vol. RAN WG1, No. Prague, Czech Republic; Aug. 21, 2017-Aug. 25, 2017Aug. 20, 2017 (Aug. 20, 2017), XP051316887. Retrieved from the Internet: URL: http://www.3gpp. org/ftp/Meetings_3GPP SYNC/RAN1/Docs/ [retrieved on Aug. 20, 2017].
First Office Action of the European application No. 17928417.9, dated Nov. 25, 2020.
First Office Action of the Russian application No. 2020111524, dated Oct. 23, 2020.
International Search Report in the international application No. PCT/CN2017/106076, dated Jun. 27, 2018.
First Office Action of the Chinese application No. 202010456236.1, dated Jun. 10, 2021.
Second Office Action of the European application No. 17928417.9, dated May 3, 2021.
Office Action of the Indian application No. 202017018759, dated Jun. 14, 2021.
Second Office Action of the Chinese application No. 202010456236. 1, dated Sep. 9, 2021.
Third Office Action of the European application No. 17928417.9, dated Oct. 13, 2021.
Written Opinion of the Singaporean application No. 112020015890, dated Nov. 4, 2021.
Third Office Action of the Chinese application No. 202010456236. 1, dated Dec. 8, 2021.

* cited by examiner

DATA TRANSMISSION METHOD, TERMINAL DEVICE, AND NETWORK DEVICE

TECHNICAL FIELD

Embodiments of the present disclosure relate to the field of communications, and more particularly to a method for data transmission, a terminal device and a network device.

BACKGROUND

People are having increasing requirements on rates, delays, high mobility and energy efficiency, and services will be diverse and complex in future life.

To this end, the 3rd Generation Partnership Project (3GPP) international Organization for Standardization started developing the 5th generation (5G) mobile communication technology. The primary application scenarios of the 5G mobile communication technology include: Enhanced Mobile Broadband (eMBB), Ultra-Reliable and Low Latency Communication (URLLC), and massive Machine-Type Communication (mMTC).

During early deployment of New Radio (NR), it would be difficult to acquire complete NR coverage. Therefore, typically, a network coverage mode of wide-area coverage with Long-Term Evolution (LTE) and island coverage with NR was employed. Moreover, since LTE is generally deployed below 6 GHz, there is little spectrum below 6 GHz that can be used for the 5G mobile communication technology. Therefore, the application of the spectrum above 6 GHz must be studied for NR. However, the coverage of the high-frequency band is limited, and signals fade quickly in the high-frequency band. In the related art, in order to protect the early LTE investment of a mobile operator, an operation mode of tight interworking between LTE and NR was proposed. In particular, LTE-NR Dual Connection (DC) data transmission is supported by means of band combination, so as to improve system throughput.

However, when a terminal device operates concurrently in two or more carriers which are in different frequency bands, uplink signals of these carriers may interfere downlink receiving signals of some carriers, reducing the success rate of data transmission.

SUMMARY

A method for data transmission, a terminal device and a network device are provided, which can improve the success rate of data transmission effectively.

In a first aspect, a method for data transmission is provided, the method including:
receiving, by a terminal device, indication information, wherein the indication information is used for the terminal device to determine a first transmission power for uplink data within a target time unit;
determining, by the terminal device, the first transmission power according to the indication information; and
sending, by the terminal device, uplink data to a first network device at the first transmission power within the target time unit.

In an embodiment of the present disclosure, indication information sent by a terminal device through a network device enables the terminal device to determine, according to a self-interference condition, a first transmission power for sending uplink data within a target time unit, so that the performance of downlink data demodulation can be effectively improved, thus improving the success rate of data transmission.

In some possible implementations, receiving, by the terminal device, indication information includes:
receiving, by the terminal device, from the first network device or a second network device, information of a time division multiplexing mode of the terminal device within the target time unit, the second network device being a network device sending downlink data to the terminal device; and
determining, by the terminal device, the first transmission power according to the indication information includes:
determining, by the terminal device, the first transmission power according to the information of the time division multiplexing mode.

In some possible implementations, when the target time unit is concurrently used for receiving downlink data and sending uplink data, the first transmission power is smaller than a maximum transmission power supported by the terminal device, or when the target time unit is merely used for sending uplink data, the first transmission power is the maximum transmission power supported by the terminal device.

In some possible implementations, the indication information includes a bitmap, the bitmap includes at least one numeric value, the at least one numeric value is used for the terminal device to determine a transmission power for uplink data within at least one time unit, and the at least one time unit includes the target time unit.

In some possible implementations, the at least one time unit is periodic.

In some possible implementations, the indication information further includes timing bias information and period information, wherein the timing bias information and the period information are used for the terminal device to determine at least one of a start position or an end position of the at least one time unit in time domain.

In some possible implementations, the indication information is used for notifying the terminal device to send uplink data to the first network device at a second transmission power within the target time unit, or the indication information is used for notifying the terminal device to send uplink data to the first network device at a third transmission power within the target time unit, wherein the second transmission power is greater than the third transmission power.

In some possible implementations, the second transmission power is a maximum transmission power supported by the terminal device.

In some possible implementations, receiving, by the terminal device, indication information includes:
receiving, by the terminal device, downlink control information (DCI) from the first network device, wherein the DCI includes the indication information.

In some possible implementations, the target time unit includes at least one of a sub-frame, a time slot, or a symbol.

In some possible implementations, the indication information is determined by the first network device or a second network device, or the indication information is determined through negotiation between the first network device and the second network device, wherein the second network device is a network device sending downlink data to the terminal device.

In some possible implementations, the indication information is interaction information between the first network device and the second network device.

In a second aspect, a method for data transmission is provided, including:

acquiring, by a first network device, indication information, wherein the indication information is used for a terminal device to determine a first transmission power, and the first transmission power is a transmission power, at which the terminal device sends uplink data to the first network device within a target time unit; and sending, by the first network device, the indication information to the terminal device.

In some possible implementations, the indication information is information of a time division multiplexing mode of the terminal device within the target time unit.

In some possible implementations, the indication information includes a bitmap, the bitmap includes at least one numeric value, the at least one numeric value is used for the terminal device to determine a transmission power for uplink data within at least one time unit, and the at least one time unit includes the target time unit. in some possible implementations, the at least one time unit is periodic.

In some possible implementations, the indication information further includes timing bias information and period information, wherein the timing bias information and the period information are used for the terminal device to determine at least one of a start position or an end position of the at least one time unit in time domain. in some possible implementations, the indication information is used for notifying the terminal device to send uplink data to the first network device at a second transmission power within the target time unit, or the indication information is used for notifying the terminal device to send uplink data to the first network device at a third transmission power within the target time unit, wherein the second transmission power is greater than the third transmission power.

In some possible implementations, the second transmission power is a maximum transmission power supported by the terminal device.

In some possible implementations, acquiring, by the first network device, indication information includes one of the following: determining, by the first network device, the indication information through negotiation with a second network device, wherein the second network device is a network device sending downlink data to the terminal device within the target time unit; receiving, by the first network device, the indication information from the second network device; or generating, the first network device, the indication information.

In some possible implementations, the indication information is generated by the first network device; and the method further includes: sending, by the first network device, the indication information to the second network device.

In some possible implementations, sending, by the first network device, the indication information to the terminal device includes:

sending, by the first network device, downlink control information (DCI) to the terminal device, wherein the DCI includes the indication information.

In some possible implementations, the method further includes:

receiving, by the first network device, within the target time unit, uplink data from the terminal device.

In some possible implementations, the target time unit includes at least one of a sub-frame, a time slot or a symbol.

In a third aspect, a method for data transmission is provided, including:

acquiring, by a second network device, indication information, wherein the indication information is used for a terminal device to determine a first transmission power, the first transmission power is a transmission power, at which the terminal device sends uplink data to a first network device within a target time unit, and the second network device is a network device sending downlink data to the terminal device; and sending, by the second network device, the indication information to the terminal device.

In some possible implementations, the indication information is information of a time division multiplexing mode of the terminal device within the target time unit.

In some possible implementations, the indication information includes a bitmap, the bitmap includes at least one numeric value, the at least one numeric value is used for the terminal device to determine a transmission power for uplink data within at least one time unit, and the at least one time unit includes the target time unit.

In some possible implementations, the at least one time unit is periodic.

In some possible implementations, the indication information further includes timing bias information and period information, wherein the timing bias information and the period information are used for the terminal device to determine at least one of a start position or an end position of the at least one time unit in time domain.

In some possible implementations, the indication information is used for notifying the terminal device to send uplink data to the first network device at a second transmission power within the target time unit, or the indication information is used for notifying the terminal device to send uplink data to the first network device at a third transmission power within the target time unit, wherein the second transmission power is greater than the third transmission power.

In some possible implementations, the second transmission power is a maximum transmission power supported by the terminal device.

In some possible implementations, acquiring, by the second network device, indication information includes:

determining, by the second network device, the indication information through negotiation with the first network device; receiving, by the second network device, the indication information from the first network device; or generating, by the second network device, the indication information.

In some possible implementations, the indication information is generated by the second network device; and the method further includes:

sending, by the second network device, the indication information to the first network device.

In some possible implementations, the method further includes:

sending, by the second network device, downlink data to the terminal device within the target time unit.

In some possible implementations, the target time unit comprises at least one of a sub-frame, a time slot or a symbol.

In a fourth aspect, a terminal device is provided, including:

a transceiving unit, configured to receive indication information, wherein the indication information is used for the terminal device to determine a first transmission power for uplink data within a target time unit; and a processing unit, configured to determine the first transmission power according to the indication information, wherein the transceiving unit is further configured to send uplink data to a first network device at the first transmission power within the target time unit.

In a fifth aspect, a network device is provided, including:

an acquisition module, configured to acquire indication information, wherein the indication information is used for a terminal device to determine a first transmission power, and the first transmission power is a transmission power, at which the terminal device sends uplink data to the network device within a target time unit; and a transceiving module, configured to send the indication information to the terminal device.

In a sixth aspect, a network device is provided, including:

an acquisition module, configured to acquire indication information, wherein the indication information is used for a terminal device to determine a first transmission power, the first transmission power is a transmission power, at which the terminal device sends uplink data to a first network device within a target time unit, and the network device is a network device sending downlink data to the terminal device; and a transceiving module, configured to send the indication information to the terminal device.

In a seventh aspect, a terminal device is provided, including:

a transceiver, configured to receive indication information, wherein the indication information is used for the terminal device to determine a first transmission power for uplink data within a target time unit; and a processor, configured to determine the first transmission power according to the indication information, wherein the transceiver is further configured to send uplink data to a first network device at the first transmission power within the target time unit.

In an eighth aspect, a network device is provided, including:

a processor, configured to acquire indication information, wherein the indication information is used for a terminal device to determine a first transmission power, and the first transmission power is a transmission power, at which the terminal device sends uplink data to the network device within a target time unit; and a transceiver, configured to send the indication information to the terminal device.

In a ninth aspect, a network device is provided, including:

a processor, configured to acquire indication information, wherein the indication information is used for a terminal device to determine a first transmission power, the first transmission power is a transmission power, at which the terminal device sends uplink data to a first network device within a target time unit, and the network device is a network device sending downlink data to the terminal device; and a transceiver, configured to send the indication information to the terminal device.

In a tenth aspect, a computer-readable medium for storing a computer program is provided, wherein the computer program includes instructions for executing the method embodiments according to the above first aspect or second aspect or third aspect.

In an eleventh aspect, a computer chip is provided, including: an input interface, an output interface, at least one processor and a memory, wherein the processor is used for executing codes in the memory, and when the codes are executed, the processor can implement each process executed by a terminal device in the method for data transmission in the above first aspect and various implementations thereof.

In a twelfth aspect, a computer chip is provided, including: an input interface, an output interface, at least one processor and a memory, wherein the processor is used for executing codes in the memory, and when the codes are executed, the processor can implement each process executed by a network device in the method for data transmission in the above second aspect or third aspect.

In a thirteenth aspect, a communication system is provided, including the foregoing network device and the foregoing terminal device.

DETAILED DESCRIPTION

Figure 1:
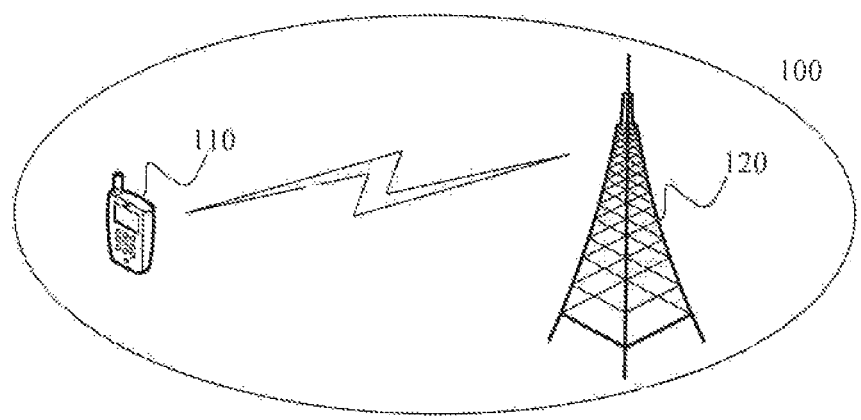
FIG. 1 illustrates an example of a communication system according to the embodiments of the present disclosure.

FIG. 1 illustrates a schematic diagram of an application scenario according to the embodiments of the present disclosure.

As illustrated in FIG. 1, a communication system 1 may include a terminal device 110 and a network device 120. The network device 120 can communicate with the terminal device 110 through an air interface. Multi-service transmission is supported between the terminal device 110 and the network device 120.

It should be understood that the communication system 100 is illustrated as an example in the embodiments of the present disclosure, but the embodiments of the present disclosure are not limited thereto. That is to say, the technical solutions of the embodiments of the present disclosure can be applied to various communication systems, for example, a Global System of Mobile communication (GSM) system, a Code Division Multiple. Access (CDMA) system, a Wideband Code Division Multiple Access (WCDMA) system, a General Packet Radio Service (CPRS) system, a Long Term Evolution (LIE) system, an LTE Time Division Duplex (TDD system and a Universal Mobile Telecommunication System (UMTS).

In addition, various embodiments are described in conjunction with the network device and the terminal device in the present disclosure.

The network device 120 may be any entity device, at a network side, for sending or receiving a signal. By way of example, the network device may be a user equipment for Machine-Type Communication (MTC), a Base Transceiver Station (BTS) in GSM or CDMA, a NodeB in WCDMA, an Evolved NodeB (eNB or eNodeB) in LTE, a base station device in a 5G network, and so on.

The terminal device 110 can be any terminal device. In particular, the terminal device 110 can communicate with one or more Core Networks through a Radio Access Network (RAN), and can also be referred to as an access terminal, user equipment (UE), a subscriber unit, a user station, a mobile station, a remote station, a remote terminal, a mobile device, a user terminal, a terminal, a wireless communication device, a user agent or a user device. For example, the terminal device may be a cell phone, a cordless phone, a Session Initiation Protocol (SIP) phone, a Wireless Local Loop (WLL) station, a Personal Digital Assistant (PDA), a hand-held device with a wireless communication function, a computer device or other processing devices connected with a wireless modem, a vehicle-mounted device, a wearable device, a terminal device in 5G network, or the like.

In a 5G communication system, during early deployment of the New Radio (NR) system, it would be difficult to acquire complete NR coverage. Therefore, typically, a network coverage mode of wide-area coverage with Long-Term Evolution (LTE) and island coverage with NR was employed. Moreover, since LTE is generally deployed below 6 GHz, there is little spectrum below 6 GHz that can be used for the 5G communication.

In order to solve the above problem, in the embodiments of the present disclosure, LTE-NR dual connection (DC) data transmission is enabled by means of band combination, so as to improve system throughput. However, when a terminal device operates concurrently in two or more carriers which are in different frequency bands, uplink signals of these carriers may interfere downlink receiving signals of some carriers, reducing the success rate of data transmission.

For example, if a carrier F1 operates in a low-frequency band, and a carrier F2 operates in a high-frequency band, then the following three different types of mutual interference may occur.

The first type of mutual interference: the carrier F1 and the carrier F2 are both uplink carriers, and the frequency of an intermodulation (IM) signal, of a certain order, of the carrier F1 and the carrier F2 overlaps or partially overlaps with the downlink signal frequency of a carrier F3. In this case, the carriers F1 and F2 produce interference to F3. Here, F3 may be one of the carriers F1 or F2, or may be another carrier different from either F1 or F2 (at this time, the terminal may concurrently operate on more than two carriers). For example, the terminal device is configured with LTE carriers in Band 1 and Band 7, and NR carriers (3400 MHz to 3800 MHz) at the same time, then if the uplink (UL) transmission in Band 7 and the UL transmission of NR are performed concurrently, then 5th order intermodulation generated thereby may affect the sensitivity of a downlink (DL) receiver of Band 1.

The second type of mutual interference: the carrier F1 is an uplink carrier, the carrier F2 is a downlink carrier, and the multiplied frequency of the carrier F1 overlaps or partially overlaps with the frequency of the carrier F2. Then, the carrier F1 produces harmonic interference to the carrier F2. For example, the bandwidth of LTE Band 3 is 1710 MHz to 1785 MHz, and the 2nd order harmonics thereof ranges from 3420 MHz to 3570 MHz. In this way, if a terminal performs LTE uplink transmission in Band 3 and performs DL receiving in the NR frequency band 3400 MHz to 3800 MHz concurrently, then the 2nd order harmonics may interfere the sensitivity of an NR DL receiver.

The third type of mutual interference: the carrier F1 is a downlink carrier, the carrier F2 is an uplink carrier, and the multiplied frequency of the carrier F1 overlaps or partially overlaps with the frequency of the carrier F2. Then the carrier F2 produces harmonic mixing interference to F1. For example, the downlink of LTE Band 3 is within 1805 MHz to 1880 MHz, and the 2nd order harmonics thereof ranges from 3610 MHz to 3760 MHz. In this way, if a terminal performs LTE downlink receiving in Band 3 and performs uplink sending in the NR frequency band 3400 MHz to 3800 MHz concurrently, then the 2nd order harmonics of NR may interfere the sensitivity of a LTE DL receiver.

However, no matter which of the above types the self-interference of the terminal device is, the estimation (MSD) of the severity of the self-interference problem is based on the assumption of 23 dbm (the maximum transmission power of the terminal); and when the terminal device is not operating with the maximum transmission power, the corresponding self-interference may be correspondingly reduced (for the same bandwidth); therefore, the reduction of the transmission power of the interference generation party may alleviate the interference to some extent.

Therefore, the method for data transmission provided in an embodiment of the present disclosure can effectively improve the success rate of data transmission by controlling an uplink transmission power of a terminal device.

Figure 2:
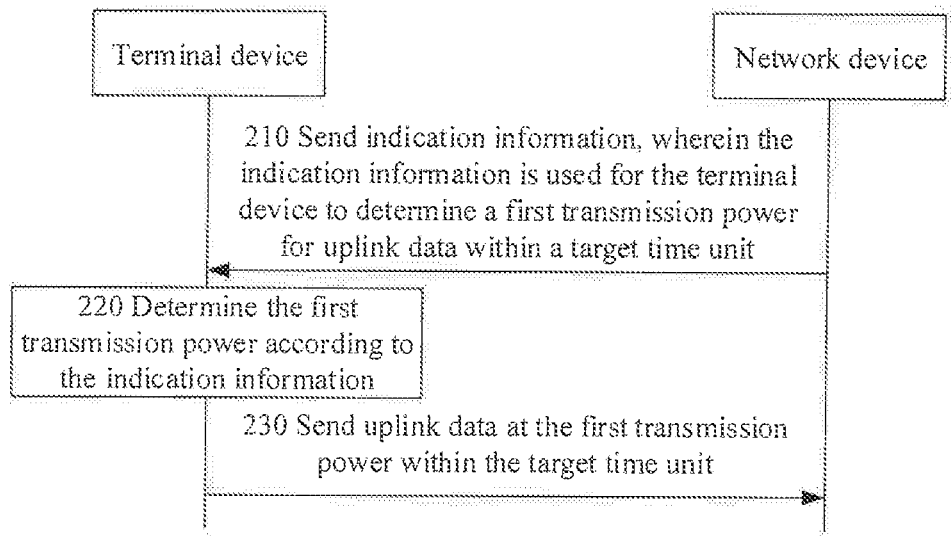
FIG. 2 illustrates a schematic flowchart of a method for data transmission according to an embodiment of the present disclosure.

FIG. 2 illustrates a schematic flowchart of a method for data transmission according to the embodiments of the present disclosure.

As illustrated in FIG. 2, the method includes the following operations.

At block 210, a network device sends indication information to a terminal device. The indication information is used for the terminal device to determine a first transmission power for uplink data within a target time unit.

At block 220, the terminal device determines the first transmission power according to the indication information.

At block 230, the terminal device sends uplink data at the first transmission power within the target time unit.

Briefly, a terminal device receives indication information; the terminal device determines a first transmission power according to the indication information; and the terminal device sends uplink data to a first network device at the first transmission power within a target time unit.

It should be understood that the terminal device in the embodiments of the present disclosure is a terminal device that may have self-interference. For the understanding of solutions, hereinafter, a network device for receiving the uplink data from the terminal device is referred to as a first network device, and a network device for sending downlink data to the terminal device is referred to as a second network device.

In particular, at the same time of sending uplink data to the first network device, the terminal device may receive downlink data from a second network device; 2.at this time, the uplink data produces self-interference to the receiving of the downlink data, thus reducing the performance of downlink data demodulation. In other words, mutual interference is produced between a first channel and a second channel of the terminal device. In other words, the first channel has self-interference.

In order to solve the above problem, in the embodiments of the present disclosure, indication information sent by a terminal device through a network device enables the terminal device to determine, according to the self-interference condition, a first transmission power for sending uplink data within a target time unit. The performance of downlink data demodulation can be effectively improved, thus improving the success rate of data transmission.

It should also be understood that, the first transmission power in the embodiments of the present disclosure may be a maximum transmission power (a second transmission power) supported by the terminal device, or may be a limited transmission power (a third transmission power) of the terminal device. The second transmission power is greater than the third transmission power.

The third transmission power may be any transmission power smaller than the second transmission power. Alternatively, the terminal device may determine the limited maximum transmission power (namely, the third transmission power) according to the anti-interference capability of the terminal device. The limited maximum transmission power is smaller than the maximum transmission power (namely, the second transmission power) supported by the terminal device.

It should be understood that the anti-interference capability of the terminal device can be a transmission power determined by the terminal device according to the internal interference level of the terminal device. In other word, if the terminal device sends uplink data below the limited maximum transmission power, the level of interference to a receiving end can be reduced to a level that the receiving end can tolerate. That is to say, when the terminal device receives and sends data concurrently, the sending power should be below the limited maximum transmission power, so that it can be ensured that the terminal device can correctly demodulate the received data.

In the embodiments of the present disclosure, when the terminal sends data at the second transmission power, a high-order modulation and coding strategy (MCS) can be employed, so as to improve the amount of sent uplink data on the basis of ensuring the reliability of the uplink data; and when the terminal sends data at the third transmission power, a low-order modulation and coding strategy (MCS) can be employed to ensure the reliability of uplink data.

In addition, it should be noted that the indication information in the embodiments of the present disclosure can be information determined by the first network device or the second network device, and can also be information determined through negotiation between the first network device and the second network device. This is not particularly specified in the embodiments of the present disclosure.

Further, the indication information is interaction information between the first network device and the second network device. That is, the first network device and the second network device need to interact with respect to the indication information. In other words, if the indication information is determined by, the first network device, then the first network device needs to send the indication information to the second network device; and if the indication information is determined by the second network device, then the second network device needs to send the indication information to the first network device.

Exemplary illustration is made hereinafter to the indication information in the embodiments of the present disclosure in conjunction with particular embodiments.

In one embodiment, the indication information is information of a time division multiplexing mode of the terminal device within the target time unit. That is, the terminal device can determine the first transmission power according to the information of the time division multiplexing mode.

In particular, the terminal device receives, from the first network device or a second network device, information of a time division multiplexing mode of the terminal device within the target time unit, the second network device being a network device sending downlink data to the terminal device; and the terminal device determines the first transmission power according to the information of the time division multiplexing mode.

For example, when the target time unit is concurrently used for receiving downlink data and sending uplink data, the first transmission power is smaller than a maximum transmission power supported by the terminal device, or when the target time unit is merely used for sending uplink data, the first transmission power is the maximum transmission power supported by the terminal device.

In another embodiment, the indication information includes a bitmap, the bitmap includes at least one numeric value, the at least one numeric value is used for the terminal device to determine a transmission power for uplink data within at least one time unit, and the at least one time unit includes the target time unit. Alternatively, the target time unit includes at least one of a sub-frame, a time slot, or a symbol.

In other words, according to the indication information, the terminal device can determine in which of the at least one time unit uplink data can be sent at a normal uplink power, and in which of the at least one time unit uplink data can be sent at a limited uplink power.

For example, the at least one numeric value is a bitmap (bit sequence), and each bit represents a time unit. When a corresponding bit is set to 1, it indicates that uplink data is sent at a limited uplink power within the time unit, otherwise, the uplink data is sent at a normal power, in other words, when a corresponding bit is set to 0, it indicates that uplink data is sent at a normal power, otherwise, the uplink data is sent at the limited uplink power within the time unit.

It should be understood that the at least one numeric value in the embodiments of the present disclosure can be used for merely indicating one of the at least one time unit, or can be used for indicating multiple of the at least one time unit.

For example, the at least one time unit can be periodic.

Further, the indication information further includes timing bias information and period information. The timing bias information and the period information are used for the terminal device to determine at least one of a start position or an end position of the at least one time unit in time domain.

In another embodiment, the network device can directly notify in which time unit the terminal device needs to send uplink data at the second transmission power, and in which time unit the terminal device needs to send uplink data at the third transmission power.

In particular, the indication information is used for notifying the terminal device to send uplink data to the first network device at a second transmission power within the target time unit, or the indication information is used for notifying the terminal device to send uplink data to the first network device at a third transmission power within the target time unit. The second transmission power is greater than the third transmission power.

Further, the second transmission power can be a maximum transmission power supported by the terminal device.

Alternatively, the terminal device can acquire the indication information by receiving downlink control information (DCI) from the first network device. For example, the DCI includes the indication information.

It should be understood that the idea of the embodiments of the present disclosure consists in that a network device sends indication information to a terminal device so that the terminal device determines a transmission power for sending uplink data. That is to say, the indication information is merely exemplary illustration of the embodiments of the present disclosure, and the embodiments of the present disclosure are not limited thereto.

Figure 3:
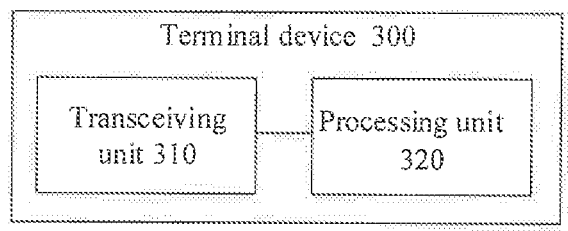
FIG. 3 illustrates a schematic block diagram of a terminal device according to an embodiment of the present disclosure.

FIG. 3 illustrates a schematic block diagram of a terminal device 300 according to the embodiments of the present disclosure.

As illustrated in FIG. 3, the terminal device 300 includes a transceiving unit 310 and a processing unit 320.

The transceiving unit is configured to receive indication information. The indication information is used for the terminal device to determine a first transmission power for uplink data within a target time unit.

The processing unit 320 is configured to determine the first transmission power according to the indication information.

The transceiving unit 310 is further configured to send uplink data to a first network device at the first transmission power within the target time unit.

Alternatively, the transceiving unit 310 is configured to:

receive, from the first network device or a second network device, information of a time division multiplexing mode of the terminal device within the target time unit, the second network device being a network device sending downlink data to the terminal device; and the processing unit 320 is configured to:

determine the first transmission power according to the information of the time division multiplexing mode.

Alternatively, when the target time unit is concurrently used for receiving downlink data and sending uplink data, the first transmission power is smaller than a maximum transmission power supported by the terminal device, or when the target time unit is merely used for sending uplink data, the first transmission power is the maximum transmission power supported by the terminal device.

Alternatively, the indication information includes a bitmap (bit sequence), the bitmap includes at least one numeric value, the at least one numeric value is used for the terminal device, to determine a transmission power for uplink data within at least one time unit, and the at least one time unit includes the target time unit.

Alternatively, the at least one time unit is periodic.

Alternatively, the indication information further includes timing bias information and period information. The timing bias information and the period information are used for the terminal device to determine at least one of a start position or an end position of the at least one time unit in time domain.

Alternatively, the indication information is used for notifying the terminal device to send uplink data to the first network device at a second transmission power within the target time unit, or the indication information is used for notifying the terminal device to send uplink data to the first network device at a third transmission power within the target time unit. The second transmission power is greater than the third transmission power.

Alternatively, the second transmission power is a maximum transmission power supported by the terminal device.

Alternatively, the terminal device receives downlink control information (DCL) from the first network device. The DCI includes the indication information.

Alternatively, the target time unit includes at least one of a sub-frame, a time slot or a symbol.

Alternatively, the indication information is determined by the first network device or a second network device, or the indication information is determined through negotiation between the first network device and the second network device. The second network device is a network device sending downlink data to the terminal device.

Alternatively, the indication information is interaction information between the first network device and the second network device.

Figure 4:
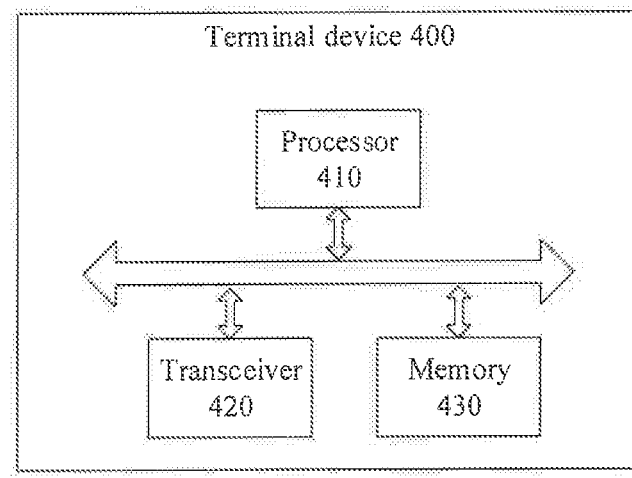
FIG. 4 illustrates another schematic block diagram of a terminal device according to an embodiment of the present disclosure.

It should be noted that the transceiving unit 310 can be realized by a transceiver, and the processing unit 32.0 can be realized by a processor. As illustrated in FIG. 4, a terminal device 400 may include a processor 410, a transceiver 420 and a memory 430. The memory 430 can be used for storing indication information, and can also be used for storing codes, instructions, etc. to be executed by the processor 410. Various components in the terminal device 400 are connected through a bus system, and the bus system further includes a power bus, a control bus and a status signal bus besides a data bus.

The terminal device 400 illustrated in FIG. 4 can implement each process which is realized by a terminal device in the foregoing method embodiment in FIG. 2, which will not be described here to avoid repetition.

Figure 5:
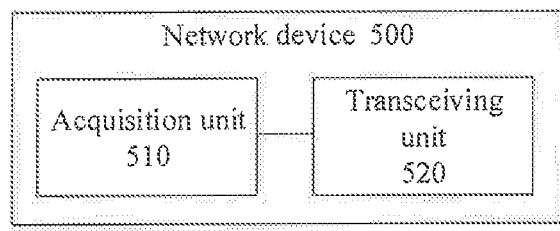
FIG. 5 illustrates a schematic block diagram of a network device according to an embodiment of the present disclosure.

FIG. 5 illustrates a schematic block diagram of a network device 500 according to the embodiments of the present disclosure.

As an embodiment, as illustrated in FIG. 5, the network device 500 includes an acquisition module 510 and a transceiving module 520.

The acquisition module is configured to acquire indication information. The indication information is used for a terminal device to determine a first transmission power, and the first transmission power is a transmission power, at which the terminal device sends uplink data to the network device within a target time unit.

The transceiving module is configured to send the indication information to the terminal device.

Alternatively, the indication information is information of a time division multiplexing mode of the terminal device within the target time unit.

Alternatively, the indication information includes a bitmap (bit sequence), the bitmap includes at least one numeric value, the at least one numeric value is used for the terminal device to determine a transmission power for uplink data within at least one time unit, and the at least one time unit includes the target time unit.

Alternatively, the at least one time unit is periodic.

Alternatively, the indication information further includes timing bias information and period information. The timing bias information and the period information are used for the terminal device to determine at least one of a start position or an end position of the at least one time unit in time domain.

Alternatively, the indication information is used for notifying the terminal device to send uplink data to the network device at a second transmission power within the target time unit, or the indication information is used for notifying the terminal device to send uplink data to the network device at a third transmission power within the target time unit. The second transmission power is greater than the third transmission power.

Alternatively, the second transmission power is a maximum transmission power supported by the terminal device.

Alternatively, the acquisition module 510 is configured to: determine the indication information through negotiation with a second network device, the second network device being a network device sending downlink data to the terminal device within the target time unit; receive the indication information from the second network device; or generate the indication information.

Alternatively, the indication information is generated by the network device; and the transceiving module 520 is further configured to send the indication information to the second network device.

Alternatively, the transceiving module 520 is configured to send downlink control information (DCI) to the terminal device. The DCI includes the indication information.

Alternatively, the transceiving module 520 is further configured to receive, within the target time unit, uplink data from the terminal device.

Alternatively, the target time unit includes at least one of a sub-frame, a time slot or a symbol.

As another embodiment, as illustrated in FIG. 5, the network device 500 includes an acquisition module 510 and a transceiving module 520.

The acquisition module is configured to acquire indication information. The indication information is used for a terminal device to determine a first transmission power, the first transmission power is a transmission power, at which the terminal device sends uplink data to a first network device within a target time unit, and the network device is a network device sending downlink data to the terminal device.

The transceiving module is configured to send the indication information to the terminal device.

Alternatively, the indication information is information of a time division multiplexing mode of the terminal device within the target time unit.

Alternatively, the indication information includes a bitmap (hit sequence), the bitmap includes at least one numeric value, the at least one numeric value is used for the terminal device to determine a transmission power for uplink data within at least one time unit, and the at least one time unit includes the target time unit.

Alternatively, the at least one time unit is periodic.

Alternatively, the indication information further includes timing bias information and period information. The timing bias information and the period information are used for the terminal device to determine at least one of a start position or an end position of the at least one time unit in time domain.

Alternatively, the indication information is used for notifying the terminal device to send uplink data to the first network device at a second transmission power within the target time unit, or the indication information is used for notifying the terminal device to send uplink data to the first network device at a third transmission power within the target time unit. The second transmission power is greater than the third transmission power.

Alternatively, the second transmission power is a maximum transmission power supported by the terminal device.

Alternatively, the acquisition module 510 is configured to: determine the indication information through negotiation with the first network device; receive the indication information from the first network device; or generate the indication information.

Alternatively, the indication information is generated by the network device; and the transceiving module 520 is further configured to: send the indication information to the first network device.

Alternatively, the transceiving module 520 is further configured to: send downlink data to the terminal device within the target time unit.

Alternatively, the target time unit includes at least one of a sub-frame, a time slot or a symbol.

Figure 6:
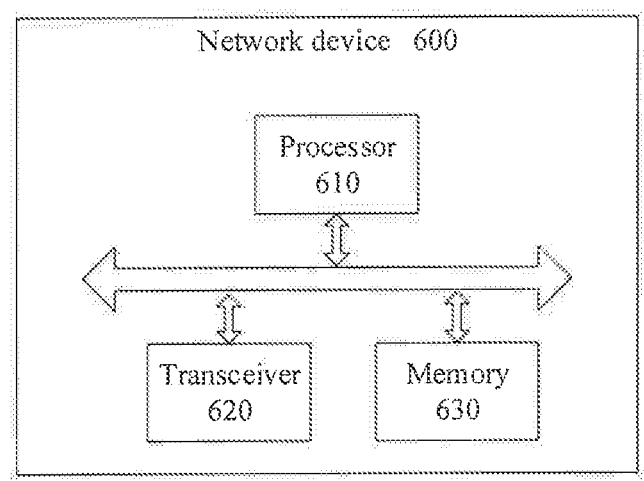
FIG. 6 illustrates another schematic block diagram of a network device according to an embodiment of the present disclosure.

It should be noted that the processing unit 510 can be realized by a processor, and the transceiving unit 520 can be realized by a transceiver. As illustrated in FIG. 6, a network device 600 may include a processor 610, a transceiver 620 and a memory 630. The memory 630 can be used for storing indication information, and can also be used for storing codes, instructions, etc. to be executed by the processor 610. Various components in the network device 600 are connected through a bus system, and the bus system further includes a power bus, a control bus and a status signal bus besides a data bus.

The network device 600 illustrated in FIG. 6 can implement each process which is realized by a network device in the foregoing method embodiments in FIGS. 2 to 4, which will not be described here to avoid repetition. That is to say, the method embodiments among the embodiments of the present disclosure can be applied to a processor, or can be realized by a processor.

During implementation, each step in the method embodiments among the embodiments of the present disclosure can be completed by an integrated logic circuit in the form of hardware or an instruction in the form of software in a processor. More particularly; steps of the method disclosed in conjunction with the embodiments of the present disclosure can be directly embodied to be executed and completed by a hardware decoding processor, or to be executed and completed by a combination of a hardware module and a software module in a decoding processor. The software module can be located in a storage medium mature in the art such as a random memory, a flash memory, a read-only memory, a programmable read-only memory or an electrically erasable programmable memory and a register. The storage medium is located in a memory, and a processor reads information in the memory and completes steps of the above methods in combination with hardware therein.

The processor may be an integrated circuit chip, has the signal processing capability, and can realize or execute various methods, steps and logic block diagrams disclosed in the embodiments of the present disclosure. For example, the processor can be a general-purpose processor, a digital signal processor (DSP), an application specific integrated circuit (ASIC), a field programmable gate array (FPGA), or other programmable logical devices, transistor logic devices, discrete hardware components, etc. Additionally, the general-purpose processor can be a micro-processor, or the processor can also be any conventional processor, etc.

Moreover, in the embodiments of the present disclosure, the memory can be a volatile memory or a non-volatile memory, or can include both a volatile and non-volatile memory. The non-volatile memory can be a read-only memory (ROM), a programmable ROM (PROM), an erasable PROM (EPROM), an electrically EPROM (EEPROM) or a flash memory. The volatile memory can be a random access memory (RAM), which serves as an external cache. It should be understood that the memories are exemplary but not limiting illustration; by way of example, the memories in the embodiments of the present disclosure can also be a static RAM (SRAM), a dynamic RAM (DRAM), a synchronous DRAM (SDRAM), a double data rate SDRAM (DDR SDRAM), an enhanced SDRAM (ESDRAM), a synch link DRAM (SLDRAM), a Direct Rambus RAM (DR RAM), etc. That is to say, the memories for the systems and methods described herein are intended to include hut are not limited to these and any other suitable types of memories.

At last, it should be noted that the terms used in the embodiments of the present disclosure and the appended claims are merely for the purpose of describing specific embodiments, but not for limiting the embodiments of the present disclosure.

For example, the singular forms such as "a/an", "said" and "the" used in the embodiments of the present disclosure and the appended claims are also intended to include plural forms, unless clearly indicated otherwise in the context.

For another example, terms "first terminal device" and "second terminal device" may be used in the embodiments of the present disclosure, but these terminal devices should not be limited by these terms. These terms are merely used for distinguishing types of cell groups from one another.

For another example, depending on the context, the word "when" as used herein can be explained as "if" or "in case of" or "at the time of" or "in response to determining that" or "in response to detecting that". Similarly, depending on the context, phrases "if it is determined that" or "if it is detected that (a stated condition or event)" can be explained as "when it is determined that" or "in response to determining that" or "when it is detected that (the stated condition or event)" or "in response to detecting that (the stated condition or event)".

Those of ordinary skill in the art may realize that the units and algorithm steps of each example described in conjunction with the embodiments disclosed herein can be implemented by electronic hardware, or a combination of computer software and electronic hardware. Whether to carry out these functions by way of hardware or software depends on the specific application of technical solutions and design constraint conditions. Professionals can use a different method for each specific application to achieve a described function, but such achievement should not be considered as exceeding the scope of the embodiments of the present disclosure.

Those skilled in the art can clearly appreciate that, for the convenience and simplicity of description, corresponding processes in the foregoing method embodiments can be referred to for the particular operation processes of the systems, devices and units described above, which will not be described here.

In several embodiments provided in the present application, it should be understood that the disclosed systems, devices and methods can be implemented in other means. For example, the device embodiments described above are merely illustrative. For example the division of units is merely division of logical functions, and there may be another division mode during actual implementation. For example, multiple units or components can be combined or integrated to another system, or some features can be neglected or not executed. Another point is that the illustrated or discussed inter-coupling or direct coupling or communication connections can be realized through some interfaces, and indirect coupling or communicative connections between devices or units can be electrical, mechanical or in other forms.

The units illustrated as separate assemblies may or may not be physically separate, and assemblies illustrated as units may or may not be physical units; that is to say, they can be located at the same place or can also be distributed to multiple network units. Some or all of the units can be chosen to realize the purpose of the embodiments of the present disclosure according to actual requirements.

In addition, various functional units in the embodiments of the present disclosure can be integrated in one processing unit, can also exist physically separately by each unit itself, and can also be the case where two or more units are integrated in one unit.

If realized in the form of software functional units or marketed or used as individual products, the functional units can be stored in a computer-readable storage medium. Based on such understanding, the technical solutions of the embodiments of the present disclosure substantially, either the part having contribution to the related art or part of the technical solutions, can be embodied in the form of a software product; and the computer software product is stored in one or more storage mediums, and include several instructions for enabling a computer device (which may be a personal computer, a server, or a network device or the like) to execute all or some of steps of the methods according to the embodiments of the present disclosure. The foregoing storage medium include various types of mediums that can store program codes, such as a USB flash disk, a mobile hard disk, a read-only memory, a random access memory, a magnetic disk or an optical disc.

Described above are merely detailed description of the embodiments of the present disclosure, but the scope of protection of the embodiments of the present disclosure is not limited thereto; any variations or alternatives that may easily occur to those familiar with the technical field should fall within the scope of protection of the embodiments of the present disclosure. Therefore, the scope of protection of the embodiments of the present disclosure should be determined by the scope of protection of the claims.

The invention claimed is:

1. A method for data transmission, comprising:
   receiving, by a terminal device, indication information, wherein the indication information is used for the terminal device to determine a first transmission power for uplink data within a target time unit;
   determining, by the terminal device, the first transmission power according to the indication information; and
   sending, by the terminal device, uplink data to a first network device at the first transmission power within the target time unit,
   wherein the indication information comprises a bitmap, the bitmap comprises at least one numeric value, the at least one numeric value is used for the terminal device to determine a transmission power for uplink data within at least one time unit, and the at least one time unit comprises the target time unit,
   wherein receiving, by the terminal device, indication information comprises:
   receiving, by the terminal device, from the first network device or a second network device, information of a time division, multiplexing mode of the terminal device within the target time unit the second network device being a network device sending downlink data to the terminal device; and
   wherein determining, by the terminal device, the first transmission power according to the indication information comprises:
   determining, by the terminal device, the first transmission power according to the information of the time division multiplexing mode,
   wherein when the target time unit is concurrently used for receiving downlink data and sending uplink data, the first transmission power is smaller than a maximum transmission power supported by the terminal device, and
   when the tarciet time unit is merely used for sending, uplink data, the first transmission power is the maximum transmission power supported by the terminal device.

2. The method according to claim 1, wherein the at least one time unit is periodic.

3. The method according to claim 2, wherein the indication information further comprises timing bias information and period information, wherein the timing bias information and the period information are used for the terminal device to determine at least one of a start position or an end position of the at least one time unit in time domain.

4. The method according to claim 1, wherein the indication information is used for notifying the terminal device to send uplink data to the first network device at a second transmission power within the target time unit, or the indication information is used for notifying the terminal device to send uplink data to the first network device at a third transmission power within the target time unit, wherein the second transmission power is greater than the third transmission power.

5. The method according to claim 1, wherein the target time unit comprises at least one of a sub-frame, a time slot, or a symbol.

6. The method according to claim 1, wherein the indication information is determined by the first network device or a second network device, or the indication information is determined through negotiation between the first network device and the second network device, wherein the second network device is a network device sending downlink data to the terminal device.

7. The method according to claim 6, wherein the indication information is interaction information between the first network device and the second network device.

8. A terminal device, comprising:
a transceiver, configured to receive indication information, wherein the indication information is used for the terminal device to determine a first transmission power for uplink data within a target time unit; and
a processor, configured to determine the first transmission power according to the indication information,
wherein the transceiver is further configured to send uplink data to a first network device at the first transmission power within the target time unit,
wherein the indication information comprises a bitmap, the bitmap comprises at least one numeric value, the at least one numeric value is used for the terminal device to determine a transmission power for uplink data within at least one time unit, and the at least one time unit comprises the target time unit,
wherein the transceiver is configured to:
receive, from the first network device or a second network device, information of a time division multiplexing mode of the terminal device within the target time unit, the second network device being a network device sending downlink data to the terminal device, and
wherein the processor is configured to:
determine the first transmission power according to the information of the time division multiplexing mode,
wherein when the target time unit is concurrently used for receiving downlink data and sending uplink data, the first transmission power is smaller than a maximum transmission power supported by the terminal device, and
when the target time unit is merely used for sending, uplink data, the first transmission power is the maximum transmission power supported by the terminal device.

9. The terminal device according to claim 8, wherein the at least one time unit is periodic.

10. The terminal device according to claim 8, wherein the indication information is used for notifying the terminal device to send uplink data to the first network device at a second transmission power within the target time unit, or the indication information is used for notifying the terminal device to send uplink data to the first network device at a third transmission power within the target time unit, wherein the second transmission power is greater than the third transmission power, wherein the second transmission power is a maximum transmission power supported by the terminal device.

11. The terminal device according to claim 10, wherein the transceiver is configured to receive downlink control information (DCI) from the first network device, wherein the DCI comprises the indication information.

12. The terminal device according to claim 8, wherein the target time unit comprises at least one of a sub-frame, a time slot or a symbol.

13. The terminal device according to claim 8, wherein the indication information is determined by the first network device or a second network device, or the indication information is determined through negotiation between the first network device and the second network device, wherein the second network device is a network device sending downlink data to the terminal device.

14. The terminal device according to claim 13, wherein the indication information is interaction information between the first network device and the second network device.

* * * * *